US012283672B2

(12) United States Patent
Werner et al.

(10) Patent No.: US 12,283,672 B2
(45) Date of Patent: Apr. 22, 2025

(54) BATTERY FIRE SUPPRESSANT SYSTEM

(71) Applicant: INTERNATIONAL BUSINESS MACHINES CORPORATION, Armonk, NY (US)

(72) Inventors: John S. Werner, Fishkill, NY (US); Noah Singer, White Plains, NY (US); John Torok, Poughkeepsie, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/481,402

(22) Filed: Oct. 5, 2023

(65) Prior Publication Data
US 2024/0030511 A1    Jan. 25, 2024

Related U.S. Application Data

(62) Division of application No. 16/951,226, filed on Nov. 18, 2020, now Pat. No. 11,817,566.

(51) Int. Cl.
H01M 10/613    (2014.01)
A62C 3/16      (2006.01)
(Continued)

(52) U.S. Cl.
CPC ............ *H01M 10/613* (2015.04); *A62C 3/16* (2013.01); *H01M 10/627* (2015.04);
(Continued)

(58) Field of Classification Search
CPC .. H01M 10/613; H01M 10/627; H01M 10/63; H01M 10/6552; H01M 10/6563; H01M 10/6568; H01M 10/667; A62C 3/16
See application file for complete search history.

(56) References Cited

U.S. PATENT DOCUMENTS 5,093,213 A   3/1992  O'Callaghan
9,539,448 B2  1/2017  Jung
(Continued)

FOREIGN PATENT DOCUMENTS

CN   104784847 A   7/2015
CN   104882639 A   9/2015
(Continued)

OTHER PUBLICATIONS

IBM: List of IBM Patents or Patent Applications Treated as Related. Filed Herewith. 2 pages.
(Continued)

*Primary Examiner* — Karie O'Neill Apicella
(74) *Attorney, Agent, or Firm* — Tihon Poltavets

(57) ABSTRACT

An apparatus for a fire suppressant system on a server rack includes an integrated battery feature, a manifold, a conduit, and a control card, where the integrated battery feature includes a plurality of battery cells in an enclosure. A first end of the conduit coupled to a control valve on the manifold and a second end of the conduit coupled to the integrated battery feature. The control card configured to open the control valve on the manifold, where the control valve is configured to release a fire suppressant into the enclosure of the integrated battery feature. In one embodiment, the fire suppressant is contained within a pressurized fire suppressant reservoir mounted on the server rack. In another embodiment, the fire suppressant is a cooling fluid diverted from a radiator cooling unit on the server rack.

12 Claims, 11 Drawing Sheets

(51) Int. Cl.
　　　*H01M 10/627* 　　(2014.01)
　　　*H01M 10/63* 　　(2014.01)
　　　*H01M 10/6552* 　(2014.01)
　　　*H01M 10/6563* 　(2014.01)
　　　*H01M 10/6568* 　(2014.01)
　　　*H01M 10/667* 　 (2014.01)

(52) U.S. Cl.
　　　CPC ....... *H01M 10/63* (2015.04); *H01M 10/6552* (2015.04); *H01M 10/6563* (2015.04); *H01M 10/6568* (2015.04); *H01M 10/667* (2015.04); *H01M 2220/10* (2013.01)

(56) References Cited

U.S. PATENT DOCUMENTS

| | | |
|---|---|---|
| 9,548,503 B2 | 1/2017 | Chikugo |
| 2010/0136391 A1 | 6/2010 | Prilutsky |
| 2012/0231304 A1 | 9/2012 | Kaiser |
| 2013/0316198 A1 | 11/2013 | Bandhauer |
| 2017/0040653 A1 | 2/2017 | Morris |
| 2017/0043194 A1 | 2/2017 | Ling |
| 2017/0050062 A1 | 2/2017 | Kirkbride |
| 2019/0140235 A1 | 5/2019 | Lindstrom |
| 2021/0176889 A1* | 6/2021 | Shao ................... H05K 7/20836 |
| 2021/0249639 A1* | 8/2021 | Shao ................... H01M 10/486 |
| 2022/0158265 A1 | 5/2022 | Werner |

FOREIGN PATENT DOCUMENTS

| | | |
|---|---|---|
| CN | 206167681 U | 5/2017 |
| CN | 206822986 U | 1/2018 |
| CN | 109513135 A | 3/2019 |
| CN | 109671993 A | 4/2019 |
| CN | 110165110 A | 8/2019 |
| CN | 111029674 A | 4/2020 |
| CN | 111481858 A | 8/2020 |
| CN | 111509163 A | 8/2020 |
| DE | 102018221942 A | 6/2020 |
| EP | 2302727 B1 | 11/2014 |
| FR | 2961705 A1 | 12/2011 |
| GB | 2584288 A | 12/2020 |
| JP | 2002276256 A | 9/2002 |
| TW | 585991 U | 11/2019 |
| WO | 2010025761 A1 | 1/2010 |
| WO | 2022106295 A2 | 5/2022 |

OTHER PUBLICATIONS

EP Application No. 21807105.8 Office Action mailed Jun. 13, 2024 9 pgs.

Notification of Transmittal of the International Search Report and the Written Opinion of the International Searching Authority, Date of Mailing Jun. 3, 2022, Reference Number P202002555, International Application No. PCT/EP2021/081364, International fling date: Nov. 11, 2020, pp. 1-20.

White Paper, "Fire Protection for Li-ion battery energy storage systems", Jan. 2019, Siemens AG, pp. 1-18.

The State Intellectual Property Office of People's Republic of China, "First office action", Jan. 10, 2025, 18 Pages, CN Application No. 202180077320.5.

* cited by examiner

BATTERY FIRE SUPPRESSANT SYSTEM

BACKGROUND

This disclosure relates generally to fire suppressant systems, and in particular, to server computer integrated battery fire suppressant systems.

Over time, energy density in batteries has increased, while packaging size for the batteries has decreased. Lithium ion batteries are an example of high energy density batteries and have become the preferred battery technology for integrated battery features on server racks. A byproduct of high energy density is that lithium ion batteries pose a greater safety risk than lower energy density technologies due to the amount of chemical energy stored in a small package. A mechanism by which high energy density batteries fail energetically is called thermal runaway, a condition where the chemical reaction inside a single cell becomes unstable due to excessive heat, which may be generated by an internal defect or by other means. Thermal runaway, also referred to as a thermal runaway event, causes the single cell to continue to heat up at an ever-accelerating rate until the structural integrity of the single cell is compromised or the single cell combusts. For a thermal runaway event in an integrated battery feature on a server rack, there can be consequential damage to surrounding electronic equipment on the server rack due to heat and direct exposure to fire.

Furthermore, a fire rescue team and fire sprinkler system responding to the thermal event can flood an entire data center potentially damaging any hardware present in the data center due to a compromised integrated battery feature on the server rack. A solution is required to mitigate and contain the thermal runaway event within the compromised integrated battery feature on the server rack to ensure surrounding electronic equipment in the entire data center is not compromised.

SUMMARY

One aspect of an embodiment of the present invention discloses an apparatus for a fire suppressant system, the apparatus includes an integrated battery feature, a manifold, a conduit, and a control card, where the integrated battery feature includes a plurality of battery cells in an enclosure. The apparatus further includes a first end of the conduit coupled to a control valve on the manifold and a second end of the conduit coupled to the integrated battery feature. The apparatus further includes the control card configured to open the control valve on the manifold, where the control valve is configured to release a fire suppressant into the enclosure. Advantageously, the aforementioned apparatus allows for fire suppression to occur in a single integrated battery feature, while protecting surrounding electronic equipment (e.g., other integrated battery features, processor drawers) from the fire suppressant. The single integrated battery feature contains the fire suppressant to prevent the fire suppressant from damaging the surrounding electronic equipment. Furthermore, the aforementioned apparatus provides early detection of a thermal runaway event that avoids a fire rescue team and/or a fire sprinkler system from flooding an entire data center and damaging any hardware present in the data center.

The apparatus can further include a fire suppressant reservoir mechanically coupled to the manifold, where the fire suppressant is pressurized in the fire suppressant reservoir. Advantageously, the aforementioned apparatus allows for a pressure-based fire suppressant delivery, for rapid fire suppression upon opening the control valve on the manifold.

The apparatus can further include a fluid manifold conduit and a radiator cooling unit valve, where a first end of the fluid manifold conduit is coupled to the manifold and a second end of the fluid manifold conduit is coupled to the radiator cooling unit valve. The apparatus can further include, the radiator cooling unit valve configured to divert cooling fluid to the fluid manifold conduit in a first configuration, where the cooling fluid is the fire suppressant. The apparatus can further include the radiator cooling unit valve configured to divert the cooling fluid to at least one processor drawer with one or more electronic components in a second configuration. Advantageously, the aforementioned apparatus allows for cooling fluid to be diverted from an existing cooling system for various electronic components, without requiring an addition cooling fluid source for providing a fire suppressant to the integrated battery feature experiencing the thermal runaway event.

A second aspect of an embodiment of the present invention discloses a method for operating a fire suppressant system, the method includes responsive to determining a thermal runaway event has been detected in an integrated battery feature on a server rack, deactivating, by one or more processors of a control card, a fan in the integrated battery feature. The method further includes configuring, by the one or more processors of the control card, a mechanical fan louver assembly and perforation louver assembly of the integrated battery feature into a closed position, where a first seal is created by the mechanical fan louver assembly in the closed position and a second seal is created by the perforation louver assembly in the closed position. The method further includes, responsive to receiving a signal from the integrated battery feature, activating, by the one or more processors of the control card, a control valve corresponding to the integrated battery feature on a manifold, where a fire suppressant is released into the integrated battery feature. Advantageously, the aforementioned method allows for fire suppression to occur in a single integrated battery feature experiencing the thermal runaway event, while protecting surrounding electronic equipment (e.g., other integrated battery features, processor drawers) from the fire suppressant. The method prevents damage to surround integrated battery features and limits the fire suppressant to the integrated battery feature experiencing the thermal runaway event. Furthermore, the aforementioned method provides early detection of a thermal runaway event that avoids a fire rescue team and/or a fire sprinkler system from flooding an entire data center and damaging any hardware present in the data center.

The method can further include deactivating, by the one or more processors of the control card, one or more processor drawers on the server rack, where the one or more processor drawers utilizes a cooling fluid for a plurality of electronic components. The method can further include instructing, by the one or more processors of the control card, a radiator cooling unit valve to redirect the cooling fluid to the manifold, where the cooling fluid is the fire suppressant. Advantageously, the aforementioned method allows for cooling fluid to be diverted from an existing cooling system for various electronic components, without requiring an addition cooling fluid source for providing a fire suppressant to the integrated battery feature experiencing the thermal runaway event.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
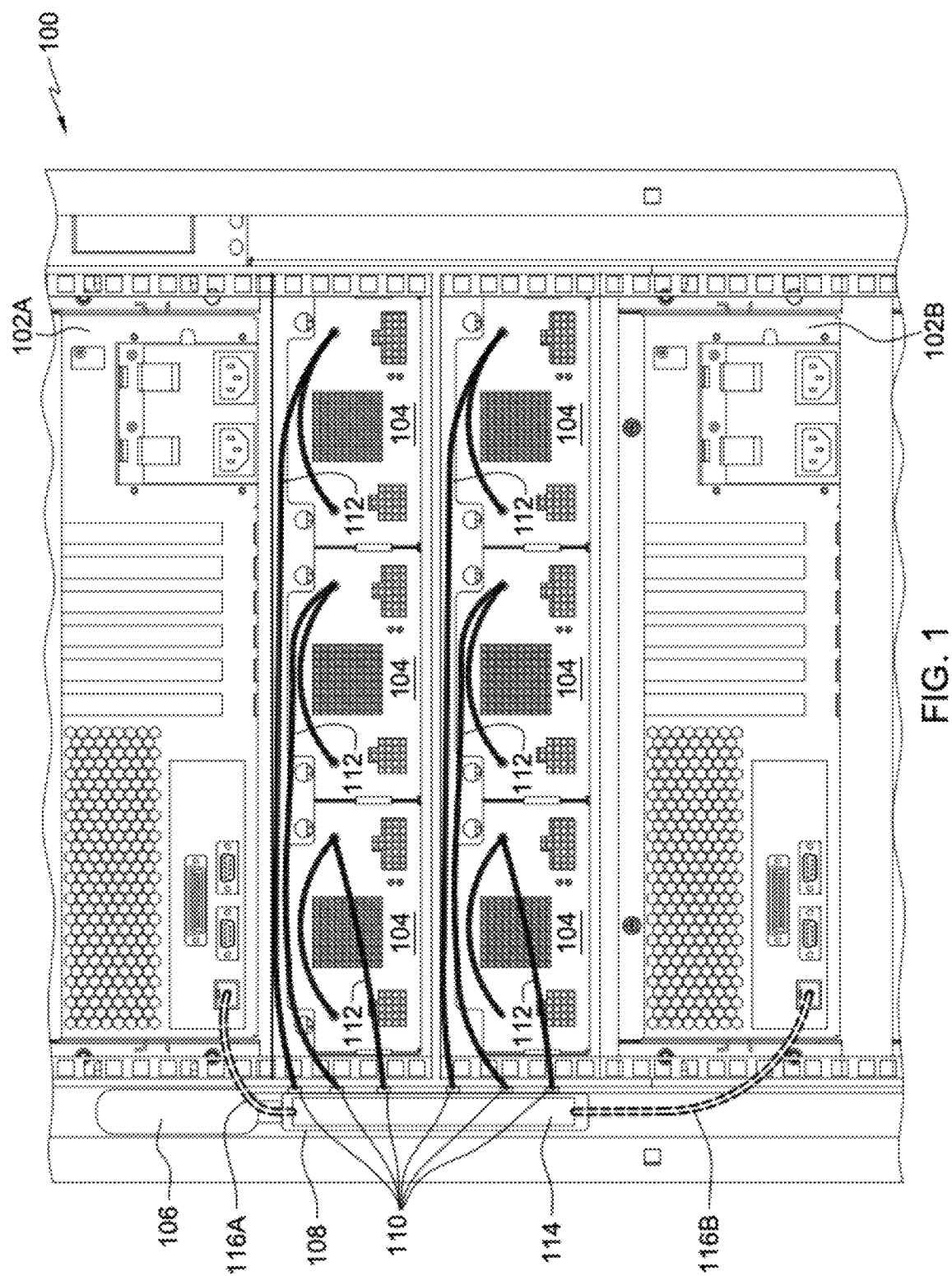
FIG. 1 depicts a server rack with a reservoir-based fire suppressant system, in accordance with an embodiment of the present invention.

Embodiments of the present invention provide an integrated battery fire suppressant system utilizing a reservoir-based fire suppressant system. The reservoir-based fire suppressant system includes a server rack with multiple integrated battery features, a fire suppressant reservoir, a manifold with multiple valves, and a control system for distributing a pressured fire suppressant from the fire reservoir through a specific valve in the manifold to a specific integrated battery feature experiencing a thermal runaway event. A method for utilizing the reservoir-based fire suppressant system includes detecting a potential thermal runaway event in one or more battery cells in a particular integrated battery feature, isolating the particular integrated battery feature by sealing any apertures, and opening a particular valve on the manifold to release a pressurized fire suppressant from the fire suppressant reservoir.

A first advantage of the reservoir-based fire suppressant system includes being able to detect and suppress a thermal runaway event in an integrated battery feature on a server rack prior to identifying a smoke or fire condition in the data center. A second advantage of the reservoir-based fire suppressant system includes isolating fire suppression to a single integrated battery feature experiencing the potential thermal runaway event versus a fire rescue team and/or fire sprinkler system deploying fire suppression to the data center in which the server rack is located. Thus, preventing damage to hardware located outside of the single integrated battery feature experiencing the potential thermal runaway event. A third advantage of the reservoir-based fire suppressant system includes being able to retrofit the reservoir-based fire suppressant system to the server rack, without altering the server rack and the bulk power assemblies. The fire suppressant reservoir and manifold with the multiple valves are mountable to a side cheek of the server rack, without altering the design of the server rack itself.

Embodiments of the present invention also provide an integrated battery fire suppressant system utilizing a cooling fluid diversion-based fire suppressant system. The cooling fluid diversion-based fire suppressant system includes a server rack with multiple integrated battery features, a cooling fluid supply, a manifold with multiple valves, fluid conduits, and a control system for redirecting the cooling fluid supply from multiple processor drawers to the manifold. From the manifold, a specific valve directs the cooling fluid to an integrated battery feature experiencing a thermal runaway event. A method for utilizing the cooling fluid diversion-based fire suppressant system includes detecting a potential thermal runaway event in one or more battery cells in a particular integrated battery feature, isolating the particular integrated battery feature by sealing any apertures, shutting down any components requiring the cooling fluid supply, and diverting the cooling fluid to the integrated battery feature experiencing the thermal runaway event.

A first advantage of the cooling fluid diversion-based fire suppressant system includes being able to detect and suppress a thermal runaway event in an integrated battery feature on a server rack prior to identifying a smoke or fire condition in the data center. A second advantage of the cooling fluid diversion-based fire suppressant system includes isolating fire suppression to a single integrated battery feature experiencing the potential thermal runaway event versus a fire rescue team or fire sprinkler system deploying fire suppression to the data center in which the server rack is located. Thus, preventing damage to hardware located outside of the single integrated battery feature experiencing the potential thermal runaway event. A third advantage of the cooling fluid diversion-based fire suppressant system includes being able to retrofit the cooling fluid diversion-based fire suppressant system to the server rack, without altering the server rack and the bulk power assemblies. The internal cooling fluid supply for the server rack is taken advantage of with a radiator cooling unit valve that can redirect the cooling fluid from the operational components requiring cooling to the integrated battery feature experiencing the thermal runaway event.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Oftentimes, the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

FIG. 1 depicts a server rack with a reservoir-based fire suppressant system, in accordance with an embodiment of the present invention. Server rack 100 includes various hardware components based on a set configuration, where the illustrated enhanced view of a portion of server rack 100 includes bulk power assembly 102A, 102B, and six integrated battery features 104. Server rack 100 further includes fire suppressant reservoir 106, suppressant manifold 108, and six suppressant control valves 110, wherein each of the six suppressant control valves 110 corresponds to each of the six integrated battery features 104. Six suppressant conduits 112 are mechanically coupled to the six suppressant control valves 110, where a first end of each suppressant conduit 112 is mechanically coupled to a single suppressant control valve 110. A second end of each suppressant conduit 112 branches into two inlet ports of each of the six integrated battery features 104 and a battery fitting at each of the two inlet ports couples each suppressant conduit 112 to integrated battery feature 104, discussed in further detail with regards to FIG. 2. Though in this embodiment there are two inlet ports on each integrated battery feature 104, in other embodiments there can be one or more inlet ports for providing the fire suppressant into each integrated battery feature 104. Fire suppressant reservoir 106 is mechanically coupled to suppressant manifold 108, where fire suppressant reservoir 106 is configured to provide a fire suppressant to suppressant manifold 108. Suppressant manifold 108 is configured to provide the fire suppressant to each of the six suppressant control valves 110, where each of the six suppressant control valves 110 are independently operated by control card 114. Each of the six suppressant control valves 110 are configured to provide the fire suppressant to each of the six suppressant conduits 112 and each of the six suppressant conduits 112 are configured to provide the fire suppressant to a corresponding integrated battery feature 104.

In this embodiment, fire suppressant reservoir 106 is positioned in a side cheek (i.e., frame cavity) of server rack 100 but in other embodiments, fire suppressant reservoir 106 can be positioned anywhere on server rack 100 based on a configuration of the hardware in server rack 100. A type of fire suppressant that fire suppressant reservoir 106 stores can include a chemical cleaning agent (e.g., heptafluoropropane (HFC-227ea)) or inert gases (e.g., nitrogen, argon, carbon dioxide, or any combination of the two or more) which reduce oxygen levels to a point where combustion is unsustainable. A fire suppressant expansion rate correlates to a volume of each of integrated battery features 104 versus a volume of fire suppressant reservoir 106, where the volume of fire suppressant reservoir 106 is less than the volume of integrated battery feature 104. In this embodiment, to ensure fire suppressant reservoir 106 encompasses a minimum amount of volume on server rack 100, the volume of fire suppressant reservoir 106 includes a capacity to flood a single integrated battery feature 104. In other embodiments, where available volume on server rack 100 allows, the volume of fire suppressant reservoir 106 includes a capacity to flood two or more integrated battery features 104 from the six total integrated battery features 104 on server rack 100.

In this embodiment, the fire suppressant contained within fire suppressant reservoir 106 is pressurized, where each suppressant control valve 110 is configured to release the pressurized fire suppressant to a corresponding integrated battery feature 104. In other embodiments, fire suppressant reservoir 106 is mechanically coupled to a suppressant reservoir control valve and a pump mechanism (not illustrated in FIG. 1), where the pump mechanism operates off power supplied to server rack 100. The suppressant reservoir control valve is configured to release the fire suppressant and the pump mechanism, operated by control card 114, is configured to pressurize the fire suppressant to suppressant manifold 108. In yet another embodiment, fire suppressant reservoir 106 is mechanically coupled to the suppressant reservoir control valve and the pump mechanism, where the pump mechanism directs the fire suppressant to a desired integrated battery feature 104.

Each suppressant control valve 110 regulates to which corresponding integrated battery feature 104 the fire suppressant is sent. During normal operations where no thermal event is detected, control card 114 is configured to instruct each suppressant control valve 110 to remain in a closed position. Subsequent to a detection of a thermal event in at least one integrated battery feature 104, control card 114 is configured to instruct a suppressant control valve 110 corresponding to the at least one integrated battery feature 104 to change from the closed position to an open position. As previously discussed, suppressant manifold 108 includes six suppressant control valves 110 corresponding to the six integrated battery features 104. However, a number of suppressant control valves 110 can vary depending on a number of integrated battery features 104 as provided by a configuration of server rack 100 and various applications of integrated battery features 104.

Control card 114 is configured to receive communications from each bulk power assembly 102A and 102B indicating an operational status of each integrated battery feature 104. During a thermal event, control card 114 is configured to communicate to the corresponding integrated battery feature 104 through a corresponding bulk power assembly 102A or 102B, to turn off internal fans and close louvers to cover all apertures to a surround environment. Subsequently, control card 114 is configured to instruct a corresponding suppressant control valve 110 to open to release the pressurized fire suppressant to the corresponding integrated battery feature 104 via suppressant conduit 112. For this embodiment, the internal fans and louver assemblies of integrated battery features 104 are discussed in further detail with regards to FIG. 2 and a method executed by a fire suppressant program operating on control card 114 is discussed in further detail with regards to FIG. 4. Communication cables 116A and 116B correspond respectively to bulk power assembly 102A and 102B, where a first end of communication cables 116A and 116B are electrically coupled to control card 114 and a second end of communication cables 116A and 116B are electrically coupled to bulk power assembly 102A and 102B, respectively. Each integrated battery feature 104 includes a battery management system configured to monitor a state status of a plurality of cells within each integrated battery feature 104 and to communication the state status to a corresponding bulk power assembly 102A or 102B.

Figure 2:
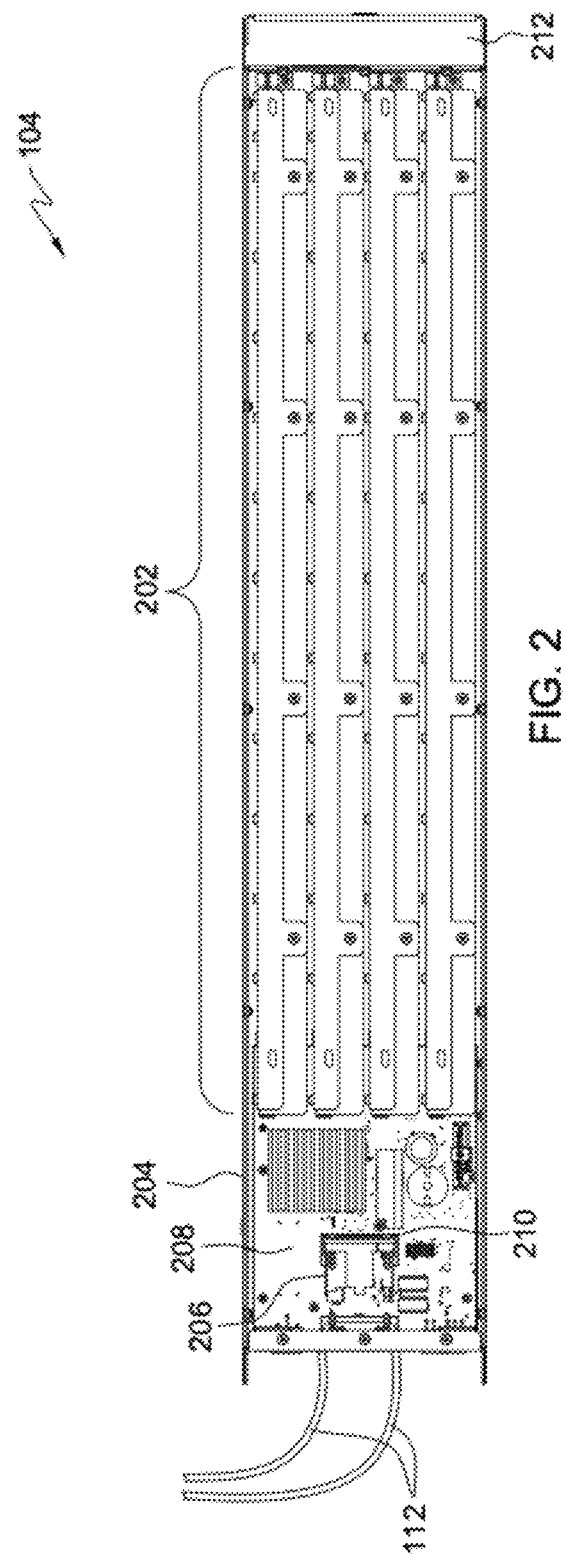
FIG. 2 depicts an integrated battery feature in a reservoir-based fire suppressant system, in accordance with an embodiment of the present invention.

FIG. 2 depicts an integrated battery feature in a reservoir-based fire suppressant system, in accordance with an embodiment of the present invention. In this embodiment, integrated battery feature 104 includes a plurality of battery cells 202 disposed within enclosure 204 monitored by a battery management system, where the battery management system is capable of detecting a thermal event in one or more battery cells 202. Fan 206 is disponed on printed circuit board 208 at a first end of enclosure 204, where a first end of fan 206 is configured to direct airflow at a second end of fan 206 towards the plurality of battery cells 202 and any internal circuitry within integrated battery feature 104 (e.g., printed circuit board 208). As previously mentioned in FIG. 1, prior to control card 114 opening suppressant control valve 110 to release a fire suppressant into integrated battery feature 104 via suppressant conduits 112, control card 114 instructs integrated battery feature 104 to disable fan 206. Subsequent to disabling fan 206, mechanical fan louver assembly 210 positioned at the second end of fan 206 is configured to create a seal at the second end of fan 206. One or more louvers of mechanical fan louver assembly 210 are coupled to a motor mechanism that is configured to create the seal at the second end of fan 206 in a closed position and is configured to allow air flow at the second end of fan 206 in an open position.

Perforation louver assembly 212 positioned at a second end of enclosure 204 is configured to create a seal at the second end of enclosure 204 in a closed position and is configured to allow air flow at the second end of enclosure 204 in an open position. The airflow enters at the first end of enclosure 204, passes through a first end of fan 206 to a second end of fan 206 with mechanical fan louver assembly 210, towards the plurality of battery cells 202, and out of enclosure 204 at perforation louver assembly 212. Mechanical fan louver assembly 210 and perforation louver assembly 212 in the closed position ensures the created seal at the second end of fan 206 and the second end of enclosure 204 prevents any fire suppressant from escaping integrated battery feature 104 and prevents any oxygen from entering integrated battery feature 104. Mechanical fan louver assembly 210 and perforation louver assembly 212 in the open position ensures air flow through integrated battery feature 104 between the first end and the second end of enclosure 204 during normal operations where no thermal event is detected.

Figure 3:
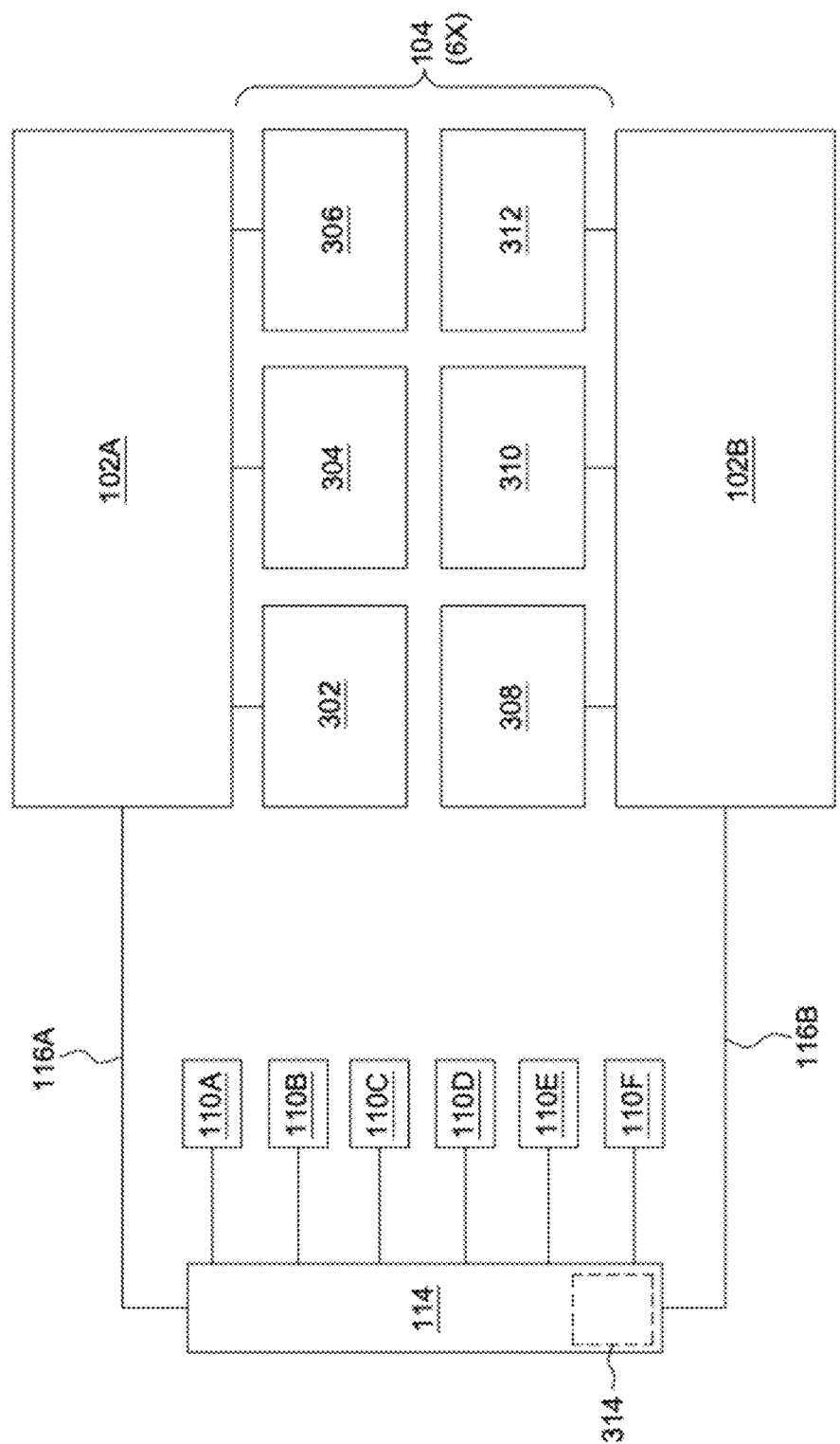
FIG. 3 depicts a control system for a reservoir-based fire suppressant system, in accordance with an embodiment of the present invention.

FIG. 3 depicts a control system for a reservoir-based fire suppressant system, in accordance with an embodiment of the present invention. In this embodiment, a first portion of three integrated battery features 104 include respective battery management systems 302, 304, and 306 electrically coupled to bulk power assembly 102A and a second portion of three integrated battery features 104 include respective battery management systems 308, 310, and 312 electrically coupled to bulk power assembly 102B. Each battery management system 302, 304, and 306 is configured to send a signal to bulk power assembly 102A in the event a thermal event is detected in a corresponding integrated battery feature 104 and each battery management system 308, 310, and 312 is configured to send a signal to bulk power assembly 102B in the event a thermal event is detected in a corresponding integrated battery feature 104. Bulk power assembly 102A and 102B relay this information to control card 114 via communication cables 116A and 116B, respectively. As previously mentioned, the method is executed by fire suppression program 314 operating on control card 114.

Control card 114 is configured to receive the information from bulk power assembly 102A or 102B and to send a signal back to the corresponding bulk power assembly 102A or 102B, instructing a particular integrated battery feature 104 to disable fan 206 and place mechanical fan louver assembly 210 and perforation louver assembly 212 into a closed position. In this embodiment, suppressant control valve 110A, 110B, and 110C respectively correspond to battery management system 302, 304, and 306, and suppressant control valve 110D, 110E, and 110F respectively correspond to battery management system 308, 310, and 312. In one example, battery management system 304 detects a thermal event and sends a signal to control card 114 via bulk power assembly 102A and communication cable 116A. Control card 114 sends a signal back instructing the battery management system 304 to disable fan 206 and place mechanical fan louver assembly 210 and perforation louver assembly 212 of associated integrated battery feature 104 into a closed position. Subsequently, control card 114 opens suppressant control valve 110B, releasing the pressurized fire suppressant into integrated battery feature 104 with battery management system 304. In another example, battery management system 312 detects a thermal event and sends a signal to control card 114 via bulk power assembly 102B and communication cable 116B. Control card 114 sends a signal back instructing the battery management system 312 to disable fan 206 and place mechanical fan louver assembly 210 and perforation louver assembly 212 of associated integrated battery feature 104 into a closed position. Subsequently, control card 114 opens suppressant control valve 110F, releasing the pressurized fire suppressant into integrated battery feature 104 with battery management system 312.

Figure 4:
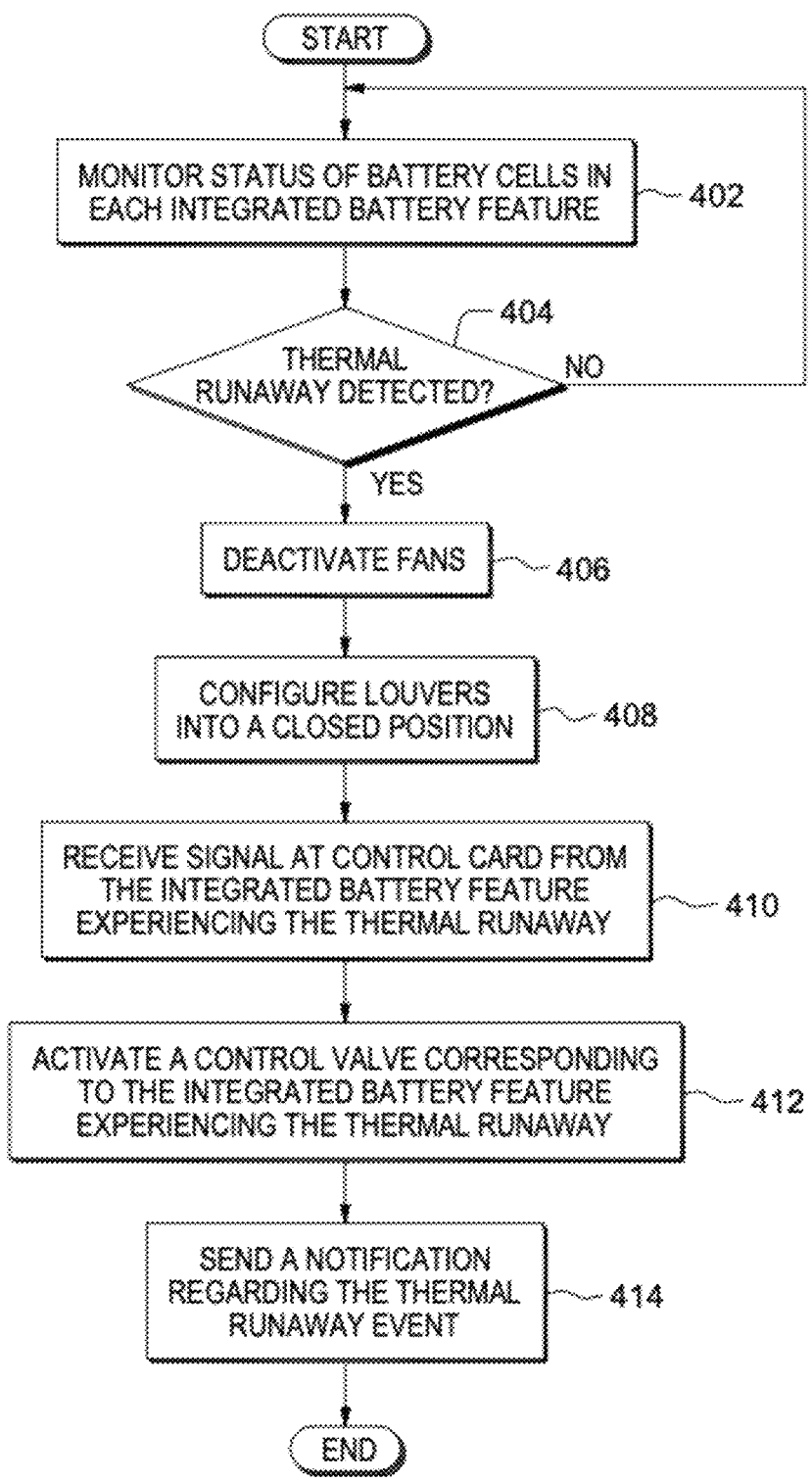
FIG. 4 depicts a process flow for a reservoir-based fire suppressant system, in accordance with an embodiment of the present invention.

FIG. 4 depicts a process flow for a reservoir-based fire suppressant system, in accordance with an embodiment of the present invention. Fire suppression program 314 monitors a status of battery cells in each integrated battery feature (402). In this embodiment, fire suppression program 314 receives data from each battery management system corresponding to each integrated battery feature via a corresponding bulk power assembly, where the data indicates whether one or more battery cells from the plurality of battery cells in the integrated battery feature are experiencing a thermal runaway event. The data can include temperature and voltage values for the plurality of battery cells in each integrated battery feature, sensor data for detection of vented gases from one or more battery cells from the plurality of battery cells of each integrated battery feature, and/or an alert indicating that one or more battery cells from the plurality of battery cells in a particular integrated battery feature is experiencing a thermal runaway event.

Fire suppression program 314 determines whether a thermal runaway event is detected (decision 404). Fire suppression program 314 determines whether a thermal runaway event is detected by analyzing changes in the temperature and voltage values in the data for the plurality of battery cells or sensor data for detection of vented gasses for one or more battery cells from the plurality of battery cells in a particular integrated battery feature. Alternatively, the detection of a thermal event is performed by a battery management system associated with a particular integrated battery features and fire suppression program 314 receives a confirmation of the thermal event at the integrated battery feature via a corresponding bulk power assembly. In the event, fire suppression program 314 determines a thermal event was detected ("yes" branch, decision 404), fire suppression program 314 deactivates the fans (406). In the event, fire suppression program 314 determines a thermal event was not detected ("no" branch, decision 404), fire suppression program 314 reverts back to monitoring the status of battery cells in each integrated battery feature (402).

Fire suppression program 314 deactivates the fans (406). Fire suppression program 314 instructs, via the bulk power assembly, the integrated battery feature with the one or more battery cells experiencing the thermal runaway event to disable one or more cooling fans for cooling the plurality of battery cells. Fire suppression program 314 configures louvers into a closed position (408). Fire suppression program 314 instructs, via the bulk power assembly, the integrated battery feature to configure the louvers of the mechanical fan louver assembly and the perforation louver assembly into a closed position.

Fire suppression program 314 receives a signal at the control card from the integrated battery feature experiencing the thermal runaway (410). Subsequent to the integrated battery feature experiencing a thermal event completing the configuration of disabling the one or more cooling fans and configuring the louvers of the mechanical fan louver assembly and the perforation louver assembly into a closed position, the integrated battery features send a signal to bulk power assembly indicating readiness for the fire suppressant. Fire suppression program 314 operating on the control card receives the signal indicating the readiness for the fire suppressant via the bulk power assembly.

Fire suppression program 314 activates a control valve corresponding to the integrated battery feature experiencing the thermal runaway (412). Fire suppression program 314 activates the control valve (i.e., open position), resulting in the pressurized fire suppressant exiting the fire suppressant reservoir and suppressant manifold through the opened control valve into a corresponding suppressant conduit. The corresponding suppressant conduit directs the fire suppressant into a sealed enclosure of the integrated battery feature with the one or more battery cells experiencing the thermal runaway event. As previously discussed, the sealed enclosure of the integrated battery feature is due to the previous instruction of configuring the louvers of the mechanical fan louver assembly and the perforation louver assembly into a closed position.

Fire suppression program 314 sends a notification regarding the thermal runaway event (414). In this embodiment, fire suppression program 314 sends a notification in the form an automated call home action for servicing the integrated battery feature that experienced the thermal runaway event. The compromised integrated battery feature that experienced the thermal runaway event requires physical removal from the service rack, where a replacement integrated battery feature can be installed in place of the compromised integrated battery feature.

Figure 5:
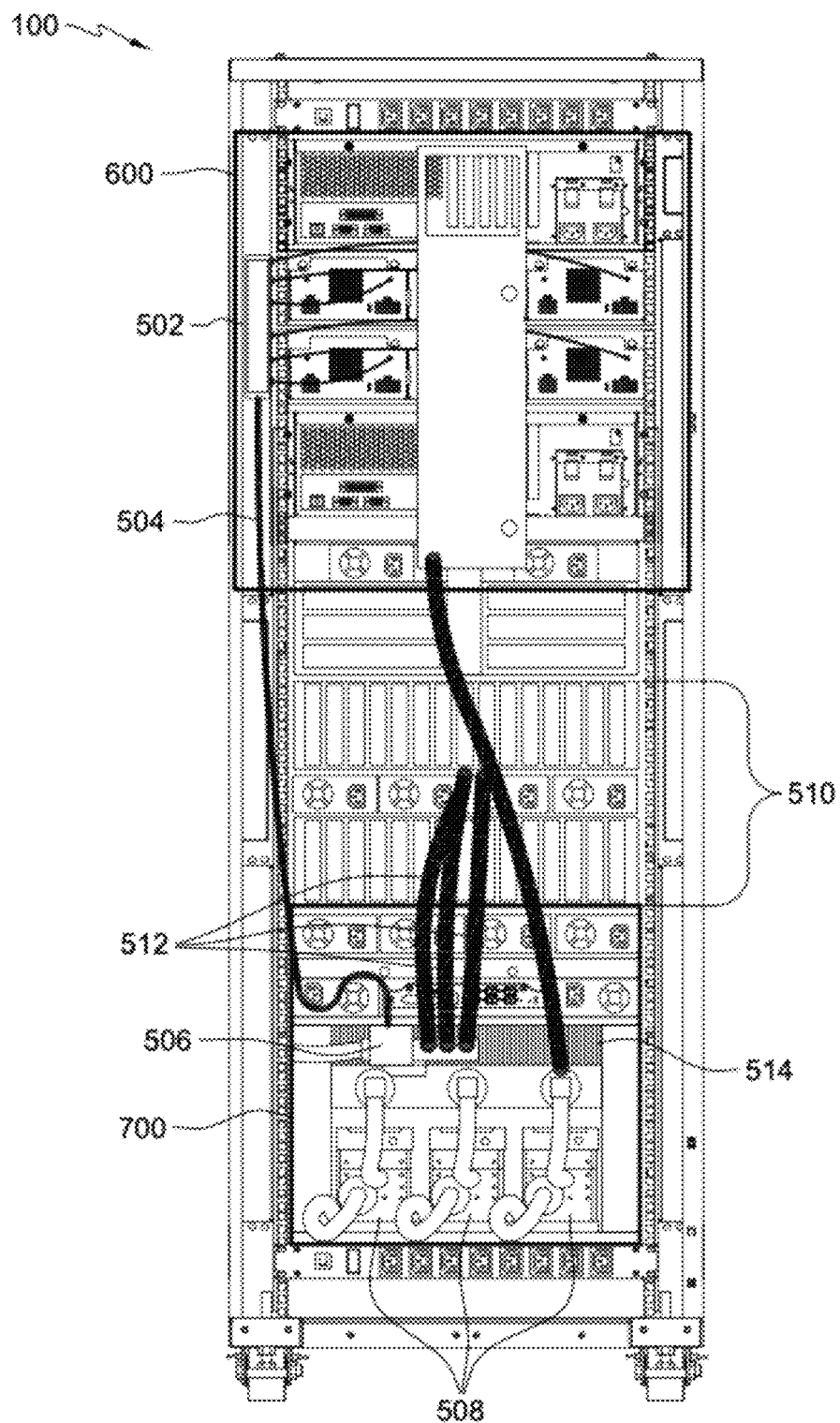
FIG. 5 depicts a server rack with a cooling fluid diversion-based fire suppressant system, in accordance with an embodiment of the present invention.

FIG. 5 depicts a server rack with a cooling fluid diversion-based fire suppressant system, in accordance with an embodiment of the present invention. Server rack 100 includes various hardware components based on a set configuration, where server rack 100 includes bulk power assembly portion 600, discussed in further detail with regards to FIG. 6, and radiator cooling unit portion 700, discussed in further detail with regards to FIG. 7. Bulk power assembly 600 includes manifold 502, where a first end of fluid manifold conduit 504 is coupled to manifold 502 and a second end of fluid manifold conduit 504 is coupled to radiator cooling unit valve 506. In a first configuration (i.e., first position), cooling fluid pumps 508 provide cooling fluid to radiator cooling unit valve 506 which is configured to deliver cooling fluid to processor drawers 510 via one or more processor conduits 512, where the cooling fluid is distributed internally though a cold plate manifold to cool various internal electronic components (e.g., processor chips). The heated fluid returns from the cold plate manifold back to radiator cooling unit portion 700 via one or more of processor conduits 512 and the heated fluid flows through radiator 514 to cool the heated fluid and return the cooled fluid back to cooling fluid pumps 508. In a second configuration (i.e., second position), cooling fluid pumps 508 provide cooling fluid to radiator cooling unit valve 506 which is configured to deliver cooling fluid to manifold 502. In another embodiment, radiator cooling unit valve 506 is implemented on an internal water loop of a system that utilizes a water-cooling unit versus a radiator cooling unit.

Figure 6:
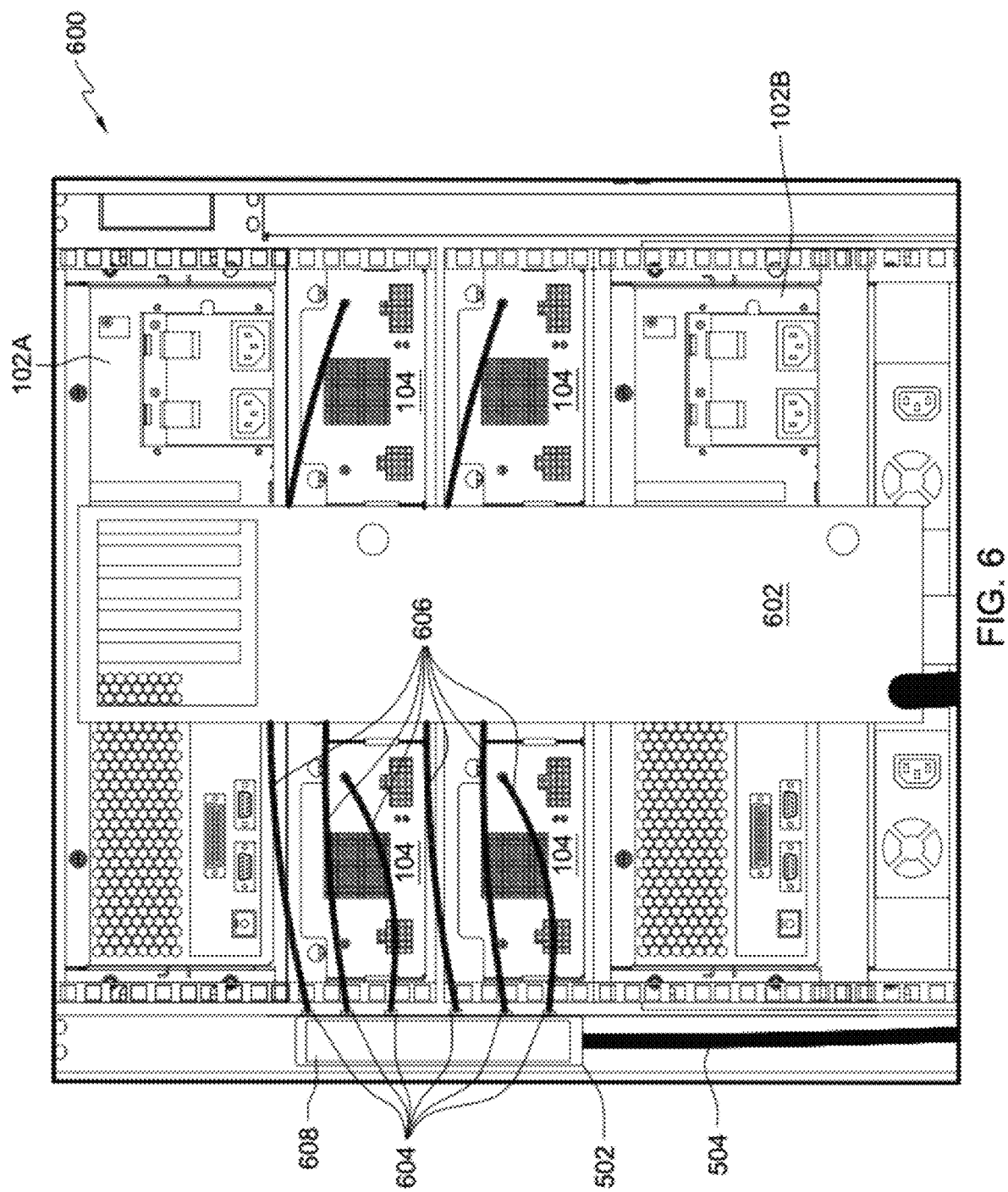
FIG. 6 depicts an enhanced view of a bulk power assembly portion of a server rack with the cooling fluid diversion-based fire suppressant system, in accordance with an embodiment of the present invention.

FIG. 6 depicts an enhanced view of a bulk power assembly portion of a server rack with the cooling fluid diversion-based fire suppressant system, in accordance with an embodiment of the present invention. Bulk power assembly portion 600 includes bulk power assembly 102A, 102B, and six integrated battery features 104, where two of the six integrated battery features are obscured by system reservoir 602 in FIG. 5B. Bulk power assembly portion 600 further includes manifold 502 and six fluid control valves 604, where each of the six fluid control valves 604 corresponding to each of the six integrated battery features 104. Six fluid conduits 606 are mechanically coupled to the six fluid control valves 604, where a first end of each fluid conduit 606 is mechanically coupled to a single fluid control valve 604. A second end of each fluid conduit 606 is coupled to an inlet port of a single integrated battery feature 104, discussed in further detail with regard to FIG. 8. Manifold 502 represents an interface between radiator cooling unit portion 700 and fluid control valves 604, where cooling fluid redirected to manifold 502 via manifold conduit 504 is directed to integrated battery feature 104 experiencing a thermal runaway event, via fluid control valve 604 and fluid conduit 606. The cooling fluid represents a suppressant to reverse the thermal runaway event occurring in a compromised integrated battery feature 104.

Each of the six fluid control valves 604 are configured to provide the cooling fluid suppressant to each of the six fluid conduits 606 and each of the six fluid conduits 606 are configured to provide the cooling fluid suppressant to a corresponding integrated battery feature 104. In one embodiment, each fluid control valve 604 remains closed until a thermal runaway event is detected and control card 608 opens a single fluid control valve 604 corresponding to integrated battery feature 104 experiencing the thermal runaway event. Control card 608 is configured to receive communications from each bulk power assembly 102A and 102B indicating an operational status of each integrated battery feature 104. During a thermal event, control card 608 is configured to communicate to the corresponding integrated battery feature 104 through a corresponding bulk power assembly 102A or 102B, to turn off internal fans and close louvers to cover all apertures to a surround environment. Subsequently, control card 608 is configured to instruct a corresponding fluid control valve 604 to open to release the suppressant cooling fluid to the corresponding integrated battery feature 104 via fluid conduit 606. For this embodiment, the internal fans and louver assemblies of integrated battery features 104 are discussed in further detail with regards to FIG. 8 and a method executed by a fire suppressant program operating on control card 608 is discussed in further detail with regards to FIG. 10.

Communication cables between control card 608 and bulk power assembly 102A and 102B allow for the transfer of data, where a first end of communication cables electrically coupled to control card 608 and a second end of the communication cables are electrically coupled to bulk power assembly 102A and 102B. Additional ports exist on bulk power assembly 102A and 102B for utilization of the communication cables, where the additional communication cables would not require additional hardware on bulk power assembly 102A and 102B for implementation. Each integrated battery feature 104 includes a battery management system configured to monitor a state status of a plurality of cells within each integrated battery feature 104 and to communication the state status to a corresponding bulk power assembly 102A or 102B.

Figure 7:
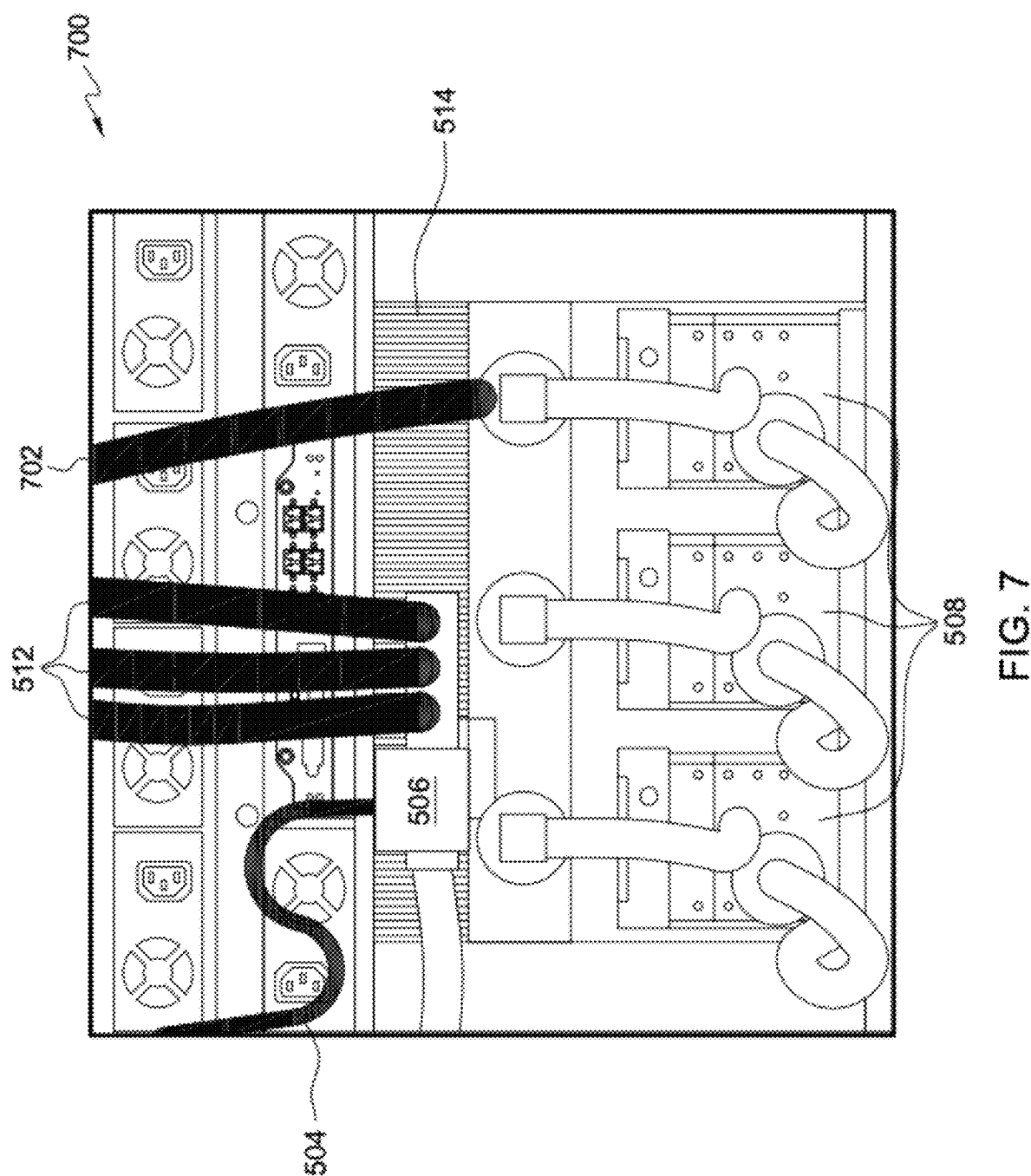
FIG. 7 depicts an enhanced view of a radiator cooling unit portion of a server rack with the cooling fluid diversion-based fire suppressant system, in accordance with an embodiment of the present invention.

FIG. 7 depicts an enhanced view of a radiator cooling unit portion of a server rack with the cooling fluid diversion-based fire suppressant system, in accordance with an embodiment of the present invention. As previously discussed, radiator cooling unit portion 700 includes radiator cooling unit valve 506 configurable to divert cooling fluid to manifold 502 via fluid manifold conduit 504 or processor drawers 510 via one or more processor conduits 512, depending on a position of radiator cooling unit valve 506.

During normal operations (i.e., no thermal runaway event detected), radiator cooling unit valve 506 is in a first configuration for providing cooling fluid to processor drawers 510. In a first configuration of radiator cooling unit valve 506, cooling fluid pumps 508 provide cooling fluid to radiator cooling unit valve 506 and radiator cooling unit valve 506 directs the cooling fluid to one or more processor conduits 512. A first end of each processor conduit 512 is mechanically coupled to radiator cooling unit valve 506 and a second end of each processor conduit 512 is mechanically coupled to processor drawers 510 (not illustrated in FIG. 7). The cooling fluid is distributed internally through a cold plate manifold to cool various internal electronic components and heated fluid returns from the cold plate manifold back to radiator cooling unit portion 700 via one or more processor conduits. The heated fluid flows to radiator 514 to cool the heated fluid and return the cooled fluid back to cooling fluid pumps 508.

In the second configuration of radiator cooling unit valve 506, cooling fluid pumps 508 provide cooling fluid to radiator cooling unit valve 506 and radiator cooling unit valve 506 directs the cooling fluid to fluid manifold conduit 504. Subsequent to detecting a thermal runaway event, control card 608 is configured to provide a signal to radiator cooling unit valve 506 to switch between the first configuration and the second configuration. The cooling fluid utilized by radiator cooling unit portion 700 is deionized to prevent any shorting of electrical components. However, for embodiments where the cooling fluid utilized by radiator cooling unit portion 700 is not deionized, a deionizing system is positioned between radiator cooling unit portion 700 and integrated battery features 104. The deionizing system can be positioned anywhere along a path that the diverted cooling fluid travels between radiator cooling unit valve 506 and integrated battery feature 104 experiencing the thermal runaway event. An additional filter can be utilized along the path that the diverted cooling fluid travels between radiator cooling unit valve 506 and integrated battery feature 104 experiencing the thermal runaway event, where the additional filter removes other additives (i.e., chemicals) that may be present in the cooling fluid (e.g., benzotriazole (BTA)).

Figure 8:
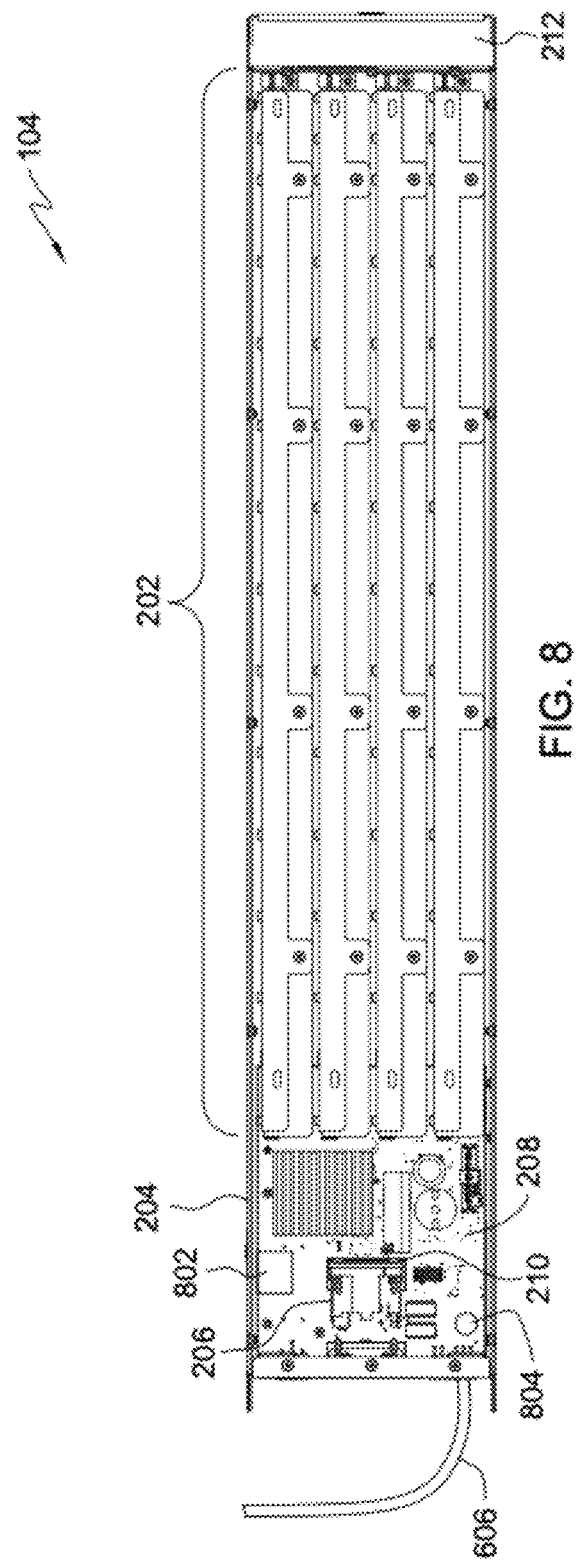
FIG. 8 depicts an integrated battery feature in a cooling fluid diversion-based fire suppressant system, in accordance with an embodiment of the present invention.

FIG. 8 depicts an integrated battery feature in a cooling fluid diversion-based fire suppressant system, in accordance with an embodiment of the present invention. In this embodiment, integrated battery feature 104 includes a plurality of battery cells 202 disposed within enclosure 204 monitored by a battery management system, where the battery management system is capable of detecting a thermal event in one or more battery cells 202. Fan 206 is disposed on printed circuit board 208 at a first end of enclosure 204, where a first end of fan 206 is configured to direct airflow at a second end of fan 206 towards the plurality of battery cells 202 and any internal circuitry within integrated battery feature 104 (e.g., printed circuit board 208). As previously mentioned in FIG. 6, prior to control card 608 opening fluid control valve 604 to release suppressant cooling fluid into integrated battery feature 104 via fluid conduit 606, control card 608 instructs integrated battery feature 104 to disable fan 206. Subsequent to disabling fan 206, mechanical fan louver assembly 210 positioned at the second end of fan 206 is configured to create a watertight seal at the second end of fan 206. One or more louvers of mechanical fan louver assembly 210 are coupled to a motor mechanism that is configured to create the watertight seal at the second end of fan 206 in a closed position and is configured to allow air flow at the second end of fan 206 in an open position.

Perforation louver assembly 212 positioned at a second end of enclosure 204 is configured to create a watertight seal at the second end of enclosure 204 in a closed position and is configured to allow air flow at the second end of enclosure 204 in an open position. The airflow enters at the first end of enclosure 204, passes through a first end of fan 206 to a second end of fan 206 with mechanical fan louver assembly 210, towards the plurality of battery cells 202, and out of enclosure 204 at perforation louver assembly 212. Mechanical fan louver assembly 210 and perforation louver assembly 212 in the closed position ensures the created watertight seal at the second end of fan 206 and the second end of enclosure 204 prevents any suppressant cooling fluid from escaping integrated battery feature 104 and prevents any oxygen from entering integrated battery feature 104. Mechanical fan louver assembly 210 and perforation louver assembly 212 in the open position ensures air flow through integrated battery feature 104 between the first end and the second end of enclosure 204 during normal operations where no thermal event is detected.

Fluid level sensor 802 electrically coupled to printed circuit board 208 can be utilized by the battery management system to monitor and measure an amount of water within integrated battery feature 104 during a flooding event with the suppressant cooling fluid. The battery management system can utilize data from fluid level sensor 802 to send a signal to control card 608 via bulk power assembly 102A or 102B to close the corresponding fluid control valve 604. Drain 804 is utilized by service personnel to remove suppressant cooling fluid from integrated battery feature subsequent to the flooding event and reduce a weight of integrated battery feature due to the suppressant cooling fluid present within enclosure 204. Drain 804 utilizes a removable plug to create a watertight seal when the suppressant cooling fluid is not being drained from integrated battery feature 104. Drain 804 is position in an area of integrated battery feature 104, where integrated battery feature 104 can partially slide out of server rack 100 (e.g., couple of inches) to expose drain 804. Drain 804 can include a hose fitting for temporarily coupling a hose for draining suppressant cooling fluid from integrated battery feature 104 or the suppressant cooling fluid can be removed utilizing a fill and drain tool insertable into drain 804. In some embodiments, integrated battery feature 104 includes a sloped lower surface of enclosure 204, where the sloped lower surface of enclosure 204 directs the suppressant cooling fluid to drain 804 without having to angle integrated battery feature 104 to drain the suppressant cooling fluid.

Figure 9:
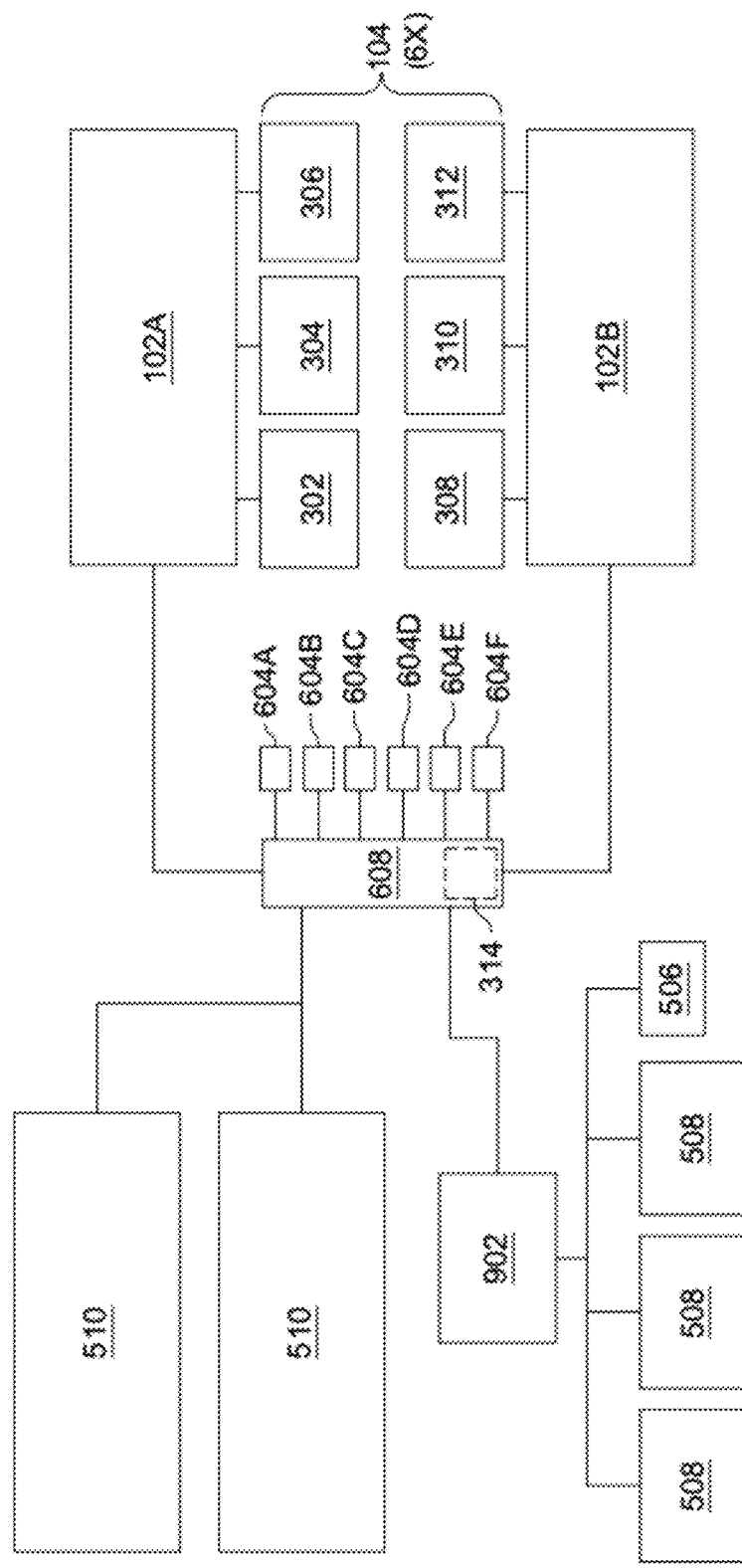
FIG. 9 depicts a control system for a cooling fluid diversion-based fire suppressant system, in accordance with an embodiment of the present invention.

FIG. 9 depicts a control system for a cooling fluid diversion-based fire suppressant system, in accordance with an embodiment of the present invention. In this embodiment, a first portion of three integrated battery features 104 include respective battery management systems 302, 304, and 306 electrically coupled to bulk power assembly 102A and a second portion of three integrated battery features 104 include respective battery management systems 308, 310, and 312 electrically coupled to bulk power assembly 102B. Each battery management system 302, 304, and 306 is configured to send a signal to bulk power assembly 102A in the event a thermal event is detected in a corresponding integrated battery feature 104 and each battery management system 308, 310, and 312 is configured to send a signal to bulk power assembly 102B in the event a thermal event is detected in a corresponding integrated battery feature 104. Bulk power assembly 102A and 102B relay this information to control card 608 via communication cables. As previously mentioned, the method is executed by fire suppression program 314 operating on control card 608.

Control card 608 is configured to receive the information from bulk power assembly 102A or 102B and to send a signal back to the corresponding bulk power assembly 102A or 102B, instructing a particular integrated battery feature 104 to disable fan 206 and place mechanical fan louver assembly 210 and perforation louver assembly 212 into a closed position. Control card 608 is also configured to send a signal to processor drawers 510 in preparation of cooling fluid being redirected by radiator cooling unit valve 506 to integrated battery feature 104 experiencing the thermal runaway event, where the signal instructs processor drawers 510 to shut down due to the pending lack of cooling fluid to cool the processor chips. In this embodiment, control card 608 instructs all processor drawers 510 to shut down due to the pending lack of cooling fluid to cool the processors chips. In other embodiments, control card 608 instructs one or more processor drawers 510 to shut down, where radiator cooling unit valve 506 redirects a portion of the cooling fluid to integrated battery feature 104 experiencing the thermal runaway event and a remaining portion of the cooling fluid to processor drawers 510 which are still operational. A set of processor drawer valves (not illustrated in FIG. 9) can be position between processor drawers 510 and radiator cooling unit valve 506, where one or more processor drawer valves corresponding to the one or more processor drawers 510 being shut down are configured into a closed position.

Control card 608 is also configured to send a signal to thermal control card 902 to change a configuration (i.e., a first configuration to a second configuration) of radiator cooling unit valve 506 and a signal to alter a flow rate of cooling fluid pumps 508 to provide the cooling fluid to integrated battery feature 104 experiencing the thermal runaway event. In this embodiment, fluid control valve 604A, 604B, and 604C respectively correspond to battery management system 302, 304, and 306, and suppressant control valve 604D, 604E, and 604F respectively correspond to battery management system 308, 310, and 312. Control card 608 is also configured to open fluid control valve 604 corresponding to integrated battery feature 104 experiencing the thermal event.

In one example, battery management system 304 detects a thermal event and sends a signal to control card 608 via bulk power assembly 102A. Control card 608 sends a signal back instructing the battery management system 304 to disable fan 206 and place mechanical fan louver assembly 210 and perforation louver assembly 212 of associated integrated battery feature 104 into a closed position. Subsequently, control card 608 instructs processor drawers 510 to shut down and sends a signal to thermal control card 902 to change a configuration (i.e., a first configuration to a second configuration) of radiator cooling unit valve 506 and to alter a flow rate of cooling fluid pumps 508. As the cooling fluid is redirected to fluid control valves 604, control card 608 opens fluid control valve 604B, releasing the suppressant cooling fluid into integrated battery feature 104 with battery management system 304.

In another example, battery management system 312 detects a thermal event and sends a signal to control card 608 via bulk power assembly 102B. Control card 608 sends a signal back instructing the battery management system 312 to disable fan 206 and place mechanical fan louver assembly 210 and perforation louver assembly 212 of associated integrated battery feature 104 into a closed position. Subsequently, control card 608 instructs processor drawers 510 to shut down and sends a signal to thermal control card 902 to change a configuration (i.e., a first configuration to a second configuration) of radiator cooling unit valve 506 and to alter a flow rate of cooling fluid pumps 508. As the cooling fluid is redirected to fluid control valves 604, control card 608 opens fluid control valve 604F, releasing the suppressant cooling fluid into integrated battery feature 104 with battery management system 304.

Figure 10:
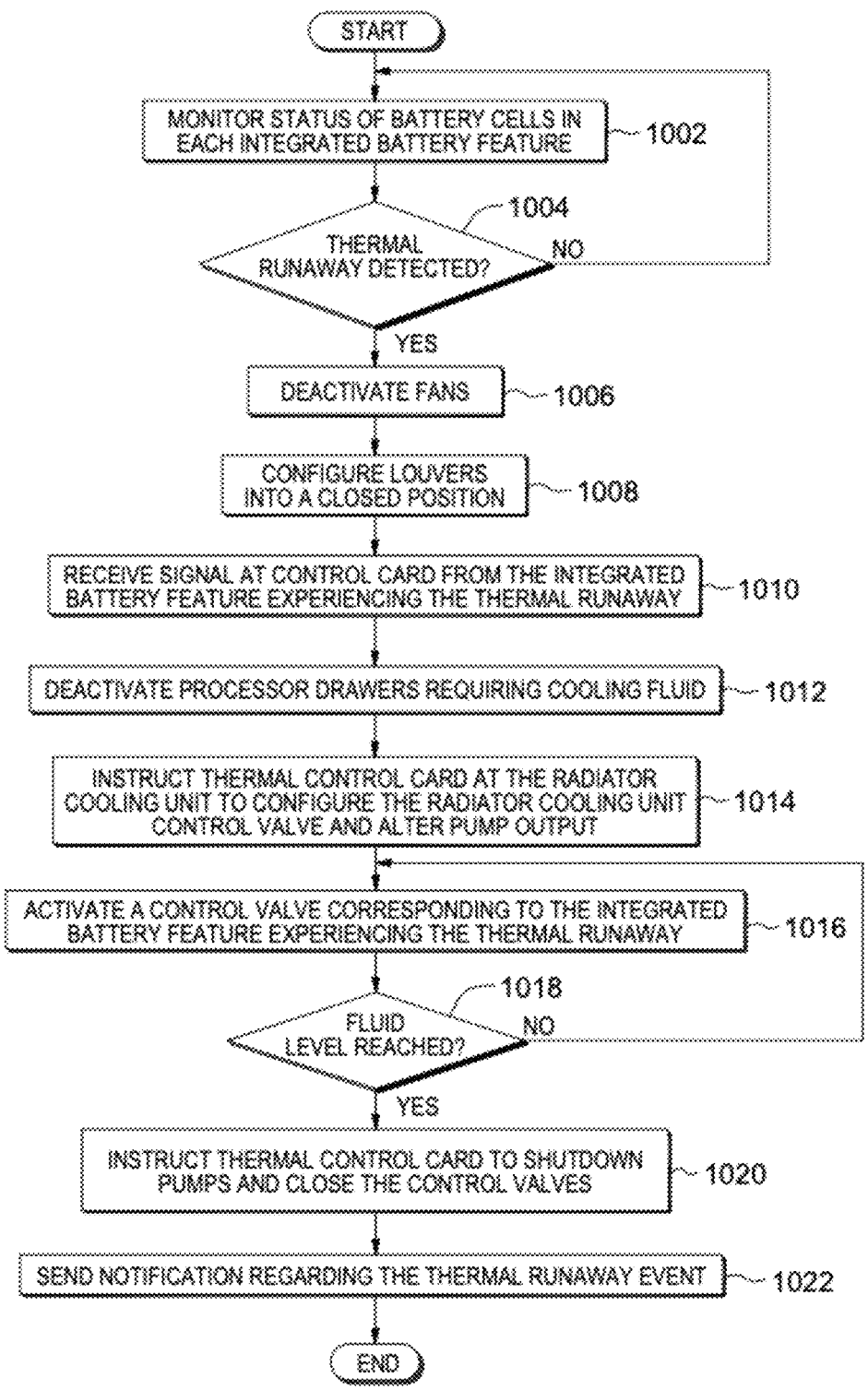
FIG. 10 depicts a process flow for a cooling fluid diversion-based fire suppressant system, in accordance with an embodiment of the present invention.

FIG. 10 depicts a process flow for a cooling fluid diversion-based fire suppressant system, in accordance with an embodiment of the present invention. Fire suppression program 314 monitors a status of battery cells in each integrated battery feature (1002). In this embodiment, fire suppression program 314 receives data from each battery management system corresponding to each integrated battery feature via a corresponding bulk power assembly, where the data indicates whether one or more battery cells from the plurality of battery cells in the integrated battery feature are experiencing a thermal runaway event. The data can include temperature and voltage values for the plurality of battery cells in each integrated battery feature, sensor data for detection of vented gases from one or more battery cells from the plurality of battery cells of each integrated battery feature, and/or an alert indicating that one or more battery cells from the plurality of battery cells in a particular integrated battery feature is experiencing a thermal runaway event.

Fire suppression program 314 determines whether a thermal runaway event is detected (decision 1004). Fire suppression program 314 determines whether a thermal runaway event is detected by analyzing changes in the temperature and voltage values in the data for the plurality of battery cells or sensor data for detection of vented gasses for one or more battery cells from the plurality of battery cells in a particular integrated battery feature. Alternatively, the detection of a thermal event is performed by a battery management system associated with a particular integrated battery feature and fire suppression program 314 receives a confirmation of the thermal event at the integrated battery feature via a corresponding bulk power assembly. In the event, fire suppression program 314 determines a thermal event was detected ("yes" branch, decision 1004), fire suppression program 314 deactivates the fans (1006). In the event, fire suppression program 314 determines a thermal event was not detected ("no" branch, decision 1004), fire suppression program 314 reverts back to monitoring the status of battery cells in each integrated battery feature (1002).

Fire suppression program 314 deactivates the fans (1006). Fire suppression program 314 instructs, via the bulk power assembly, the integrated battery feature with the one or more battery cells experiencing the thermal runaway event to disable one or more cooling fans for cooling the plurality of battery cells. Fire suppression program 314 configures louvers into a closed position (1008). Fire suppression program 314 instructs, via the bulk power assembly, the integrated battery feature to configure the louvers of the mechanical fan louver assembly and the perforation louver assembly into a closed position.

Fire suppression program 314 receives a signal at the control card from the integrated battery feature experiencing the thermal runaway (1010). Subsequent to the integrated battery feature experiencing a thermal event completing the configuration of disabling the one or more cooling fans and configuring the louvers of the mechanical fan louver assembly and the perforation louver assembly into a closed position, the integrated battery feature send a signal to bulk power assembly indicating readiness for the suppressant cooling fluid. Fire suppression program 314 operating on the control card receives the signal indicating the readiness for the suppressant cooling fluid via the bulk power assembly.

Fire suppression program 314 deactivates processor drawers requiring cooling fluid (1012). Since numerous temperature sensitive electronic components (e.g., processors chips) in the processor drawers require cooling fluid, fire suppression program 314 deactivates (i.e., shuts down) the processor drawers requiring the cooling fluid to prevent any damage to the numerous temperature sensitive electronic components. Fire suppression program 314 instructs thermal control card at the radiator cooling unit to configure the radiator cooling unit control valve and alter pump output (1014). Fire suppression program 314 instructs a thermal control card in a radiator cooling unit portion of the server rack to alter a configuration (i.e., a first position to a second position) of the radiator cooling unit valve to redirect cooling fluid to the integrated battery feature experience the thermal runaway event. Fire suppression program 314 also instructs the thermal control card in the radiator cooling unit portion of the server rack to alter an output of the cooling fluid pumps, since the cooling fluid is being redirected to the manifold located in the bulk power assembly portion of the server rack and is no longer being supplied to the processor drawers. In some embodiments, fire suppression program 314 sets the cooling fluid pumps to a maximum output (i.e., rotational speed) to ensure the cooling fluid is directed to the integrated battery feature experiencing the thermal runaway event as quickly as possible.

Fire suppression program 314 activates a control valve corresponding to the integrated battery features experiencing the thermal runaway (1016). Fire suppression program 314 activates the control valve (i.e., open position), resulting in the suppressant cooling fluid in the manifold to flow through the opened control valve into a corresponding fluid conduit. The corresponding fluid conduit directs the suppressant cooling fluid into a sealed enclosure of the integrated battery feature with the one or more battery cells experiencing the thermal runaway event. As previously discussed, the sealed enclosure of the integrated battery feature is due to the previous instruction of configuring the louvers of the mechanical fan louver assembly and the perforation louver assembly into a closed position.

Fire suppression program 314 determines whether a fluid level was reached in the integrated battery feature experiencing the thermal runaway (decision 1018). A battery management system for the integrated battery feature experiencing the thermal runaway event utilizes a fluid level sensor to determine when the fluid level is reached and fire suppression program 314 receives a signal from the battery management system indicating when the fluid level was reached in the integrated battery feature experiencing the thermal runaway event. In the event, fire suppression program 314 determines the fluid level was reached in the integrated battery feature experiencing the thermal runaway ("yes" branch, decision 1018), fire suppression program 314 instructs thermal control card to shutdown pumps and close the control valves (1020). In the event, fire suppression program 314 determines the fluid level was not reached in the integrated battery feature experiencing the thermal runaway ("no" branch, decision 1018), fire suppression program 314 reverts back to (1016) and the position of the control valve corresponding to the integrated battery feature experiencing the thermal runaway remains activated (i.e., open position).

Fire suppression program 314 instructs thermal control card to shutdown pumps and close the control valves (1020). Fire suppression program 314 instructs the thermal control card in the radiator cooling unit portion of the server rack to shut down the output of the cooling fluid pumps. Fire suppression program 314 can also instruct thermal control card to alter the configuration (i.e., a second position to a first position) of the radiator cooling unit valve to redirect cooling fluid to the processor drawers and/or instruct the control valve associated with the integrated battery feature experiencing the thermal runaway event to deactivate (i.e., closed position).

Fire suppression program 314 sends a notification regarding the thermal runaway event (1022). In this embodiment, fire suppression program 314 sends a notification in the form an automated call home action for servicing the integrated battery feature that experienced the thermal runaway event. The compromised integrated battery feature that experienced the thermal runaway event requires physically draining and removal from the service rack, where a replacement integrated battery feature can be installed in place of the compromised integrated battery feature.

Figure 11:
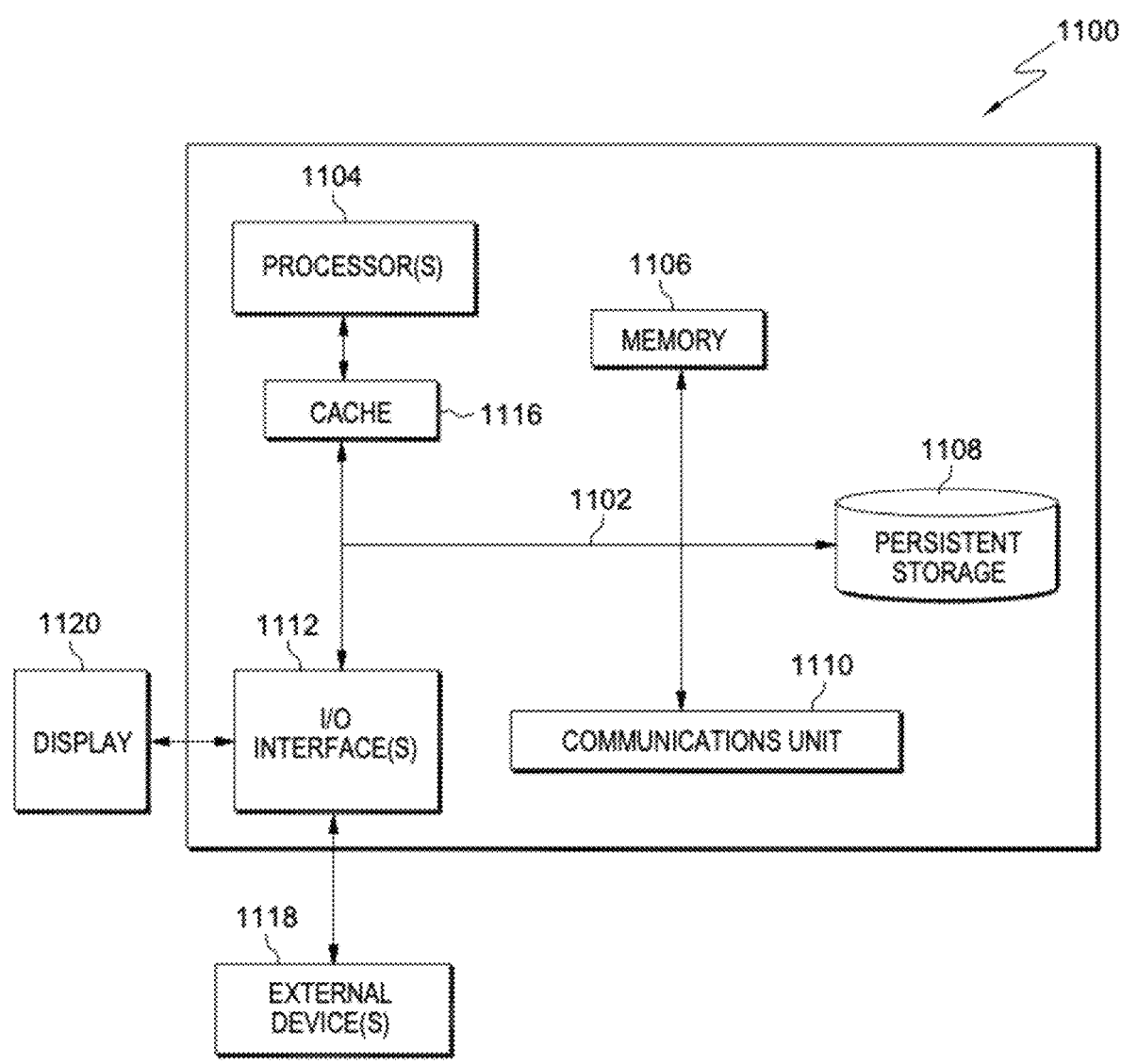
FIG. 11 depicts a block diagram of components of a control card executing a fire suppression program, in accordance with an embodiment of the present invention.

FIG. 11 depicts a block diagram of components of a control card executing a fire suppression program, in accordance with an embodiment of the present invention. Computer system 1100 represents control card 114 and control card 608 on which fire suppression program 134 operates. The computer system includes processors 1104, cache 1116, memory 1106, persistent storage 1108, communications unit 1110, input/output (I/O) interface(s) 1112 and communications fabric 1102. Communications fabric 1102 provides communications between cache 1116, memory 1106, persistent storage 1108, communications unit 1110, and input/output (I/O) interface(s) 1112. Communications fabric 1102 can be implemented with any architecture designed for passing data and/or control information between processors (such as microprocessors, communications and network processors, etc.), system memory, peripheral devices, and any other hardware components within a system. For example, communications fabric 1102 can be implemented with one or more buses or a crossbar switch.

Memory 1106 and persistent storage 1108 are computer readable storage media. In this embodiment, memory 1106 includes random access memory (RAM). In general, memory 1106 can include any suitable volatile or non-volatile computer readable storage media. Cache 1116 is a fast memory that enhances the performance of processors 1104 by holding recently accessed data, and data near recently accessed data, from memory 1106.

Program instructions and data used to practice embodiments of the present invention may be stored in persistent storage 1108 and in memory 1106 for execution by one or more of the respective processors 1104 via cache 1116. In an embodiment, persistent storage 1108 includes a magnetic hard disk drive. Alternatively, or in addition to a magnetic hard disk drive, persistent storage 1108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1108.

Communications unit 1110, in these examples, provides for communications with other data processing systems or devices. In these examples, communications unit 1110 includes one or more network interface cards. Communications unit 1110 may provide communications through the use of either or both physical and wireless communications links. Program instructions and data used to practice embodiments of the present invention may be downloaded to persistent storage 1108 through communications unit 1110.

I/O interface(s) 1112 allows for input and output of data with other devices that may be connected to each computer system. For example, I/O interface 1112 may provide a connection to external devices 618 such as a keyboard, keypad, a touch screen, and/or some other suitable input device. External devices 1118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 1108 via I/O interface(s) 1112. I/O interface(s) 1112 also connect to display 1120.

Display 1120 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining, by one or more processors of a control card, a thermal runaway event has been detected in an integrated battery feature on a server rack;
   deactivating, by the one or more processors of the control card, a fan in the integrated battery feature;
   configuring, by the one or more processors of the control card, a mechanical fan louver assembly and perforation louver assembly of the integrated battery feature into a closed position, wherein a first seal is created by the mechanical fan louver assembly in the closed position and a second seal is created by the perforation louver assembly in the closed position;
   receiving, by the one or more processors of the control card, a signal from the integrated battery feature;
   deactivating, by the one or more processors of the control card, one or more processor drawers on the server rack, wherein the one or more processor drawers utilize a cooling fluid for a plurality of electronic components;
   instructing, by the one or more processors of the control card, a radiator cooling unit valve to redirect the cooling fluid to a manifold; and
   activating, by the one or more processors of the control card, a control valve corresponding to the integrated battery feature on the manifold, wherein a fire suppressant that is the cooling fluid is released into the integrated battery feature.

2. The method of claim 1, further comprising:
   sending, by the one or more processors of the control card, a notification regarding the thermal runaway event detected in the integrated battery feature.

3. The method of claim 2, wherein the signal from the integrated battery feature confirms the mechanical fan louver assembly and the perforation louver assembly of the integrated battery feature are in the closed position.

4. The method of claim 3, wherein the fire suppressant is selected from the group consisting of: a chemical cleaning agent and inert gases.

5. The method of claim 4, wherein the fire suppressant is pressurized in a fire suppressant reservoir.

6. The method of claim 1, further comprising:

instructing, by the one or more processors of the control card, one or more cooling fluid pumps to alter an output for providing the cooling fluid to the radiator cooling unit valve.

7. The method of claim 6, further comprising:

responsive to determining a fluid level has been reach in the integrated battery feature, instructing, by the one or more processors of the control card, the one or more cooling fluid pumps to shut down.

8. The method of claim 7, further comprising:

deactivating, by the one or more processors of the control card, the control valve corresponding to the integrated battery feature on the manifold.

9. The method of claim 7, further comprising:

instructing, by the one or more processors of the control card, the radiator cooling unit valve to redirect the cooling fluid to the one or more processor drawers.

10. The method of claim 1, wherein instructing the radiator cooling unit valve to redirect the cooling fluid to the manifold further comprises:

instructing, by the one or more processors of the control card, a thermal control card to redirect the cooling fluid to the manifold via the radiator cooling unit valve.

11. The method of claim 6, wherein instructing the one or more cooling fluid pumps to alter the output for providing the cooling fluid to the radiator cooling unit valve further comprises:

instructing, by the one or more processors of the control card, a thermal control card to alter the output for providing the cooling fluid to the radiator cooling unit valve by the one or more cooling fluid pumps.

12. The method of claim 7, wherein instructing the one or more cooling fluid pumps to shut down further comprises:

instructing, by the one or more processors of the control card, a thermal control card to shut down the one or more cooling fluid pumps.

* * * * *